Figure 1:
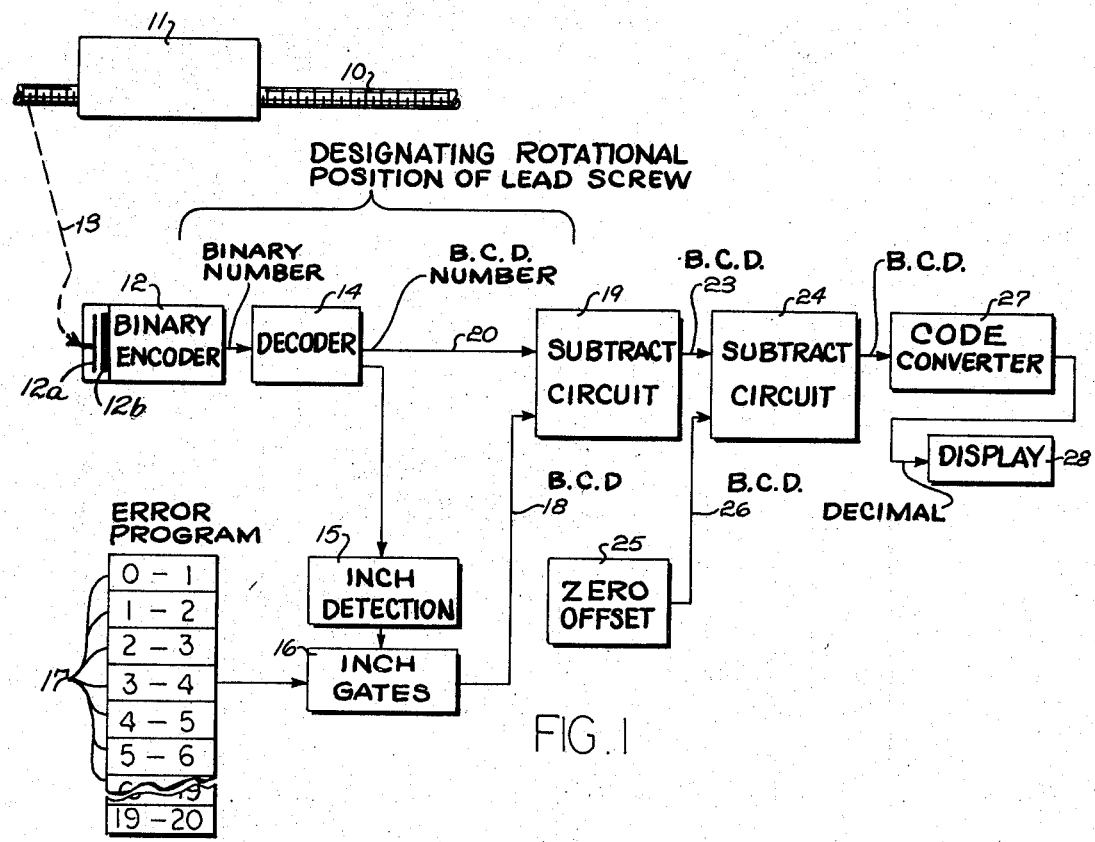

United States Patent
Cordes, Jr.

[15] 3,705,400
[45] Dec. 5, 1972

[54] ERROR-COMPENSATED POSITION DETERMINING

[72] Inventor: Edward V. Cordes, Jr., Bentleyville, Ohio

[73] Assignee: The Warner & Swasey Company, Cleveland, Ohio

[22] Filed: Dec. 24, 1970

[21] Appl. No.: 101,410

Related U.S. Application Data

[63] Continuation of Ser. No. 665,337, Sept. 5, 1967, abandoned.

[52] U.S. Cl............340/347 R, 340/347 P, 235/154, 235/151.11, 318/632
[51] Int. Cl. ...............................................G08c 9/00
[58] Field of Search...340/347 AD; 235/154, 151.11; 318/572, 632–634, 102

[56] References Cited

UNITED STATES PATENTS

| | | | |
|---|---|---|---|
| 3,491,277 | 1/1970 | Brainard | 318/634 |
| 3,492,467 | 1/1970 | Caban et al. | 235/151.11 |
| 3,491,278 | 1/1970 | Stobbe | 318/162 |
| 3,449,554 | 6/1969 | Kelling | 235/151.11 |

*Primary Examiner*—Maynard R. Wilbur
*Assistant Examiner*—Charles D. Miller
*Attorney*—Yount, Flynn & Tarolli

[57] ABSTRACT

The present system determines the linear position of a machine tool slide driven by a lead screw. The rotational position of the lead screw is sensed by an analog-to-digital converter which produces a number designating the nominal linear position of the slide corresponding to the sensed rotational position of the lead screw. The system has an error program containing, for each one-inch increment along the lead screw, a digital error signal which represents the mean deviation between the slide's actual position and its nominal position for that increment of the slide travel. The proper error signal is selected from this program in response to the inch-designating digits in the output number from the analog-to-digital converter. The selected digital error signal is combined with the latter number, either by addition or subtraction, to produce a corrected number which more accurately designates the actual linear position of the slide, thereby compensating for lead screw error. This corrected number is combined with a zero offset number to provide an offset-corrected number which designates the slide position with respect to a chosen offset zero location along the lead screw. This offset-corrected number is displayed visually as a decimal number.

14 Claims, 2 Drawing Figures

INVENTOR.
EDWARD V. CORDES, JR.
BY
Yount, Raney, Flynn and Tarolli
ATTORNEYS

ERROR-COMPENSATED POSITION DETERMINING

This application is a continuation of application Ser. No. 665,337, filed Sept. 5, 1967 now abandoned.

This invention relates to a system for determining the position of a movable member, particularly a linearly-moving member driven by a rotary driving member, such as a machine tool slide driven by a lead screw.

The present system is particularly adapted for use in a machine tool having a rotary driving member, such as a lead screw, which drivingly engages a nut on a linearly-moving driven part of the machine tool, such as a slide or carriage. Various analog-to-digital converters have been proposed heretofore which sense the rotational or angular position of the lead screw or other rotary driving member and produce a number representing the sensed rotational position. If the screw-threaded drive coupling between the lead screw and the linearly-moving driven member were completely error-free, then this number would also designate the linear position of the driven member from a predetermined reference position. However, in actual practice, a lead screw error is usually present and to offset this error the present system has novel provision for correcting the reading of the linear position of the driven member in an advantageous manner.

Prior to the present invention it has been proposed to offset the lead screw error by providing an analog correction signal from a cam whose curvature represents the error between the rotational position of the lead screw and the linear position of the driven member. This has the disadvantages of making it necessary to specially machine a cam for each lead screw to compensate for its error and to provide relatively complex and expensive equipment to apply this analog correction signal to the readout for the linearly-movable member. Also, progressive wear on the lead screw would require machining a new cam to provide the correct error compensation.

In its preferred embodiment, the present invention overcomes these disadvantages by providing an error signal program which produces an individual digital error signal for each increment of movement of the driven member, and means for selecting the proper error signal from the program to modify the digital signal which designates the actual rotational position of the lead screw and the nominal position of the driven member, so as to produce a corrected digital signal which more accurately designates the actual linear position of the driven member. The use of digital error signals enables the electronic circuitry of the present system to be relatively simple, while providing a high degree of accuracy.

It is a principal object of this invention to provide a novel and improved system for determining the position of a movable member in which the error between the nominal or apparent position of the movable member and its actual position is compensated by an error signal which corrects a signal designating its nominal or apparent position.

Another object of this invention is to provide a novel and improved system for determining the position of a linearly-movable member which is driven by a rotary driving member, in which the error between the nominal position of the linearly-movable member, as designated by a digital number indicating the rotational position of the driving member, and its actual linear position is corrected by a digital error signal selected from an error program which contains an error signal for each of the successive increments of the driven member's travel.

Another object of this invention is to provide such a system in which the digital error signals in the error program may be changed readily and conveniently to reflect changes in the actual error of the drive to the linearly-movable driven member, such as might be caused by wear on a lead screw.

Further objects and advantages of this invention will be apparent from the following detailed description of a presently-preferred embodiment with reference to the accompanying drawing.

Figure 2:
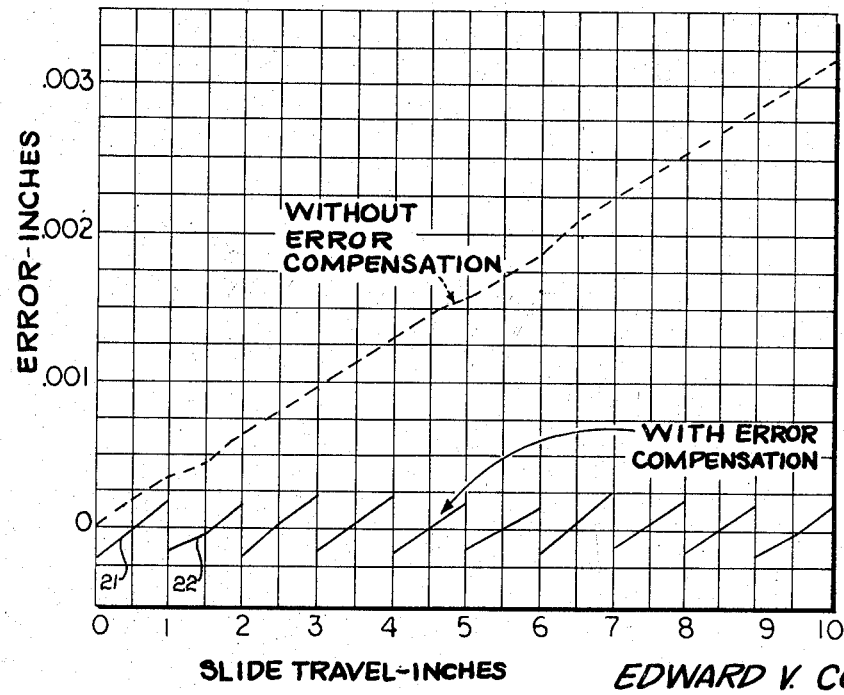

In the drawing:

FIG. 1 is a schematic block diagram showing the system of the present invention; and FIG. 2 shows a graph in which slide position error is plotted against the actual slide position, with the dashed line showing the uncompensated error curve, and the full line curve segments showing the error curve after being compensated by the system of the present invention.

Referring to FIG. 1, the present system is shown in block diagram form in association with a rotary lead screw 10 which is in screw-threaded driving engagement with a linearly-movable slide 11 of a machine tool, for example. The lead screw 10 is coupled mechanically to the rotatable input shaft of a binary encoder 12, as indicated schematically by the dashed line 13.

The encoder 12 preferably may be of the type disclosed and claimed in the copending U.S. Pat. application of Ralph H. Schuman, Ser. No. 560,951, filed June 6, 1966 and assigned to the same assignee as the present invention. That encoder has a rotatable code wheel 12a which is driven with the screw 10 and has six encoding sections for providing a number including a total of six digit places, including four decimal places. Each of the six encoding sections in the encoder 12 is read by a reader 12b which produces a group of binary output signals which are applied to corresponding logic sections in a decoder 14. Each of these logic sections in the decoder 14 contains logic elements which are arranged in accordance with the proper binary-coded decimal code for that particular section of the encoder so as to produce output signals representing the binary digits weighted 1, 2, 4 and 8 for each decade or digit place of the number. The output from the decoder 14 is a binary-coded decimal number which designates the rotational or angular position of the lead screw 10, but is calibrated in accordance with the corresponding apparent or nominal linear position of the slide 11 for that rotational position of the lead screw (i.e., ignoring the lead screw error). For example, the least significant digit position of this number may designate the nominal linear position of the slide 11 in ten-thousandths of an inch, the next digit position of this number designates the nominal linear position of the slide in thousandths of an inch, and so on. The fifth and sixth digit positions of this number designate the nominal linear position of the slide in inches and tens of inches, respectively.

The two logic sections of the decoder which respectively provide the inch and tens of inches designations are connected to "inch detection" circuitry 15, which detects each nominal inch position of the slide 11 driven by the lead screw. In one practical embodiment, the maximum straight-line travel of the slide 11 may be 20 inches, for example. The inch detection circuitry 15, in response to the output signals which it receives from these two sections of the decoder 14, determines whether the rotational movement undergone by the lead screw is such that the slide should be somewhere between its zero and one inch position, or between its one inch and two inch positions, or between 2 and 3, etc.

The output of the inch detection circuitry 15 is connected to inch gate circuitry 16 having a gating section for each of the one-inch increments into which the slide movement is divided. That is, there is a gating section for the nominal positions of the slide from 0 to 1, a gating section for the nominal positions from 1 to 2, and so on for each of the successive one-inch increments along the lead screw.

These gating sections are connected individually to corresponding error program signal sources 17, one for each of the one-inch increments along the lead screw. Each gating section is normally closed to prevent the corresponding error program signal from passing to the output line 18, except when that gating section receives a signal from the inch detection circuitry 15 telling it that the nominal position of the slide 11 is within the corresponding 1-inch increment along the lead screw 10.

Each error signal source may be provided by an error program card carrying a set of eight diodes having different binary-number weights and capable of producing a binary-coded decimal number output anywhere from 00 to 99 in the two least significant digit places. In the case under discussion, these are the ten-thousandths and the thousandths of an inch digit places.

Each of the error program signal sources 17 provides a correction signal substantially equal to the mean deviation of the actual position of the side 11 from its nominal or apparent position, as determined by the rotational position of the lead screw 10, for the corresponding one-inch increment along the lead screw. This is done by providing a calibration curve for the lead screw, which may be prepared by measuring the actual linear travel of the slide 11 with a laser interferometer and comparing it with the nominal slide travel as indicated by the encoder 12.

The dashed-line curve in FIG. 2 shows the error in the nominal slide position reading plotted against actual slide position from zero to 10 inches, where the lead screw error throughout is such that the encoder readings are too high—that is, the slide actually moves a slightly shorter distance along the lead screw for each one-inch increment than what is indicated by the encoder 12. Since the error is in the same direction for each inch increment, the cumulative error over the full ten inches of slide travel can be quite substantial. The error in the encoder reading is shown as positive in sign.

In the present system the total error in each one-inch increment of the slide travel is compensated by determining the mean deviation or error in that particular increment between the nominal slide position and its actual position. For example, in the dashed-line curve of FIG. 2, in the increment of slide travel from 0 to 1 inch, the mean deviation is substantially 0.0002 inch. Therefore, the error program for the 0-1 increment is such that it produces an error signal representing 0.0002 inch. This error signal input to the corresponding inch gating section in the gate circuitry 16 is in binary-coded decimal form.

In the example shown in FIG. 2, the encoder zero is set to match the slide zero position—i.e., the encoder reading is correct at the zero position of the slide along the lead screw.

At the start of the slide travel over the increment from 0 to 1, the 0-1 inch gating section in the inch gate circuitry 16 will be opened (in response to a signal from the inch detection circuitry 15) to pass this 0.0002 inch error signal from the 0-1 error signal source via line 18 to the input of a subtract circuit 19. The subtract circuit 19 is an adder which operates on the principle of nines complement arithmetic to subtract one input signal from another input signal. The constant 0.0002 inch error signal is applied continuously to the subtract circuit 19 as long as the slide 11 is between its nominal 0 and 1 inch positions, as detected by the inch detection circuitry 15. The complete binary-coded decimal output signal from the decoder 14, which designates the apparent or nominal position of the slide 11 along the lead screw 10, is applied continuously via line 20 to the subtract circuit 19. The subtract circuit 19 subtracts the 0-1 error signal (designating the 0.0002 inch mean error for the 0-1 increment) from the output signal of decoder 14 (representing the nominal position of the slide) throughout all nominal positions of the slide from 0 to 1 inch. This has the effect of displacing the error curve for the 0-1 increment of the slide travel from the corresponding portion of the dashed-line curve in FIG. 2 down to the full-line curve segment 21, which extends substantially equally above and below the zero error line. The mean error value of this curve segment 21 is substantially zero.

Similarly, when the slide 11 passes the nominal 1 inch position along the lead screw 10, the 0-1 inch gating section in the inch gating section circuitry 16 will be closed, and the 1-2 inch gate will be opened (in response to a signal from the inch detection circuitry 15) to pass the 1-2 increment error signal from the error program. This 1-2 increment error signal is determined by the mean value of the error of the dashed-line curve of FIG. 2 between the 1-inch and 2-inch slide travel positions, as already stated. In the specific example shown in FIG. 2, this mean error value between positions 1 and 2 is substantially 0.0004 inch.

This constant 0.0004 inch error signal is passed from the 1-2 error signal source through the respective gating section to the output line 18 leading to the subtract circuit 19 until the slide reaches the nominal 2-inch position along the lead screw, as detected by the inch detection circuitry 15. At the same time, the complete binary-coded decimal output signal from the decoder 14 is applied via line 20 to the subtract circuit 19, which subtracts the 1-2 error signal (designating the mean error value of 0.0004 inch) from the decoder output signal. This has the effect of displacing the error curve for the 1–2 inch increment of the slide travel from the corresponding portion of the dashed-line curve in FIG. 2 down to the full-line curve segment 22. The mean value of this displaced curve segment 22 is substantially zero.

Similar corrective actions take place for the slide travel through each of the successive 1-inch increments 2–3, 3–4, 4–5, etc. In each instance, throughout the slide travel over each respective 1-inch increment, the corresponding error signal is applied continuously to the subtract circuit 19 so that the mean error (between the nominal slide position, as sensed by the encoder 12, and the actual slide position) is substantially zero over this increment of the slide travel.

Thus, for each 1-inch increment of the slide travel the error in any instantaneous position of the slide is never more than about one-half the total error accumulated during this one-inch increment alone. Also, the errors for successive one-inch increments of the slide travel are not accumulated because an individual correction is made for the error occurring in each one-inch increment in succession.

The output signal from the subtract circuit 19 is a binary-coded decimal number which is applied via line 23 to the input of a second subtract circuit 24. A zero offset number in binary-coded decimal form also is applied from a signal source 25 via line 26 to the input of the second subtract circuit 24. The magnitude of this zero offset number corresponds to the distance along the lead screw between a chosen zero offset position and the slide zero position at which the reading of the encoder 12 is zero. This zero offset number is subtracted from the corrected number output from circuit 19 to designate the position of the slide 11 with respect to the chosen offset zero position along the lead screw.

The offset-corrected output signal from the second subtract circuit is a binary-coded decimal number which is converted to decimal form in a code converter 27. This decimal number then is displayed in a visual display device 28.

If the lead screw error is such as to produce a "slide lead" throughout the slide travel (i.e., the encoder readings will be too low by the amount of the accumulated "slide lead" error), the encoder 12 is set to exactly match the actual slide position when the latter is in its maximum range position (e.g., the 20-inch position when the maximum slide travel is 20 inches). This enables the operations in the subtract circuits 19 and 24 to be subtractions only, which simplifies these circuits.

If the lead screw error produces a "slide lead" for part of its length and a "slide lag" for the remainder, the encoder 12 would be set to match the actual slide position at the position of maximum error or excursion of the slide along the lead screw. This enables the circuits 19 and 24 to operate by subtracting the error number from the encoder number at any incremental position of the slide along the lead screw.

Alternatively, by the use of a more complex add/subtract and sign decision circuit in place of each of the subtract circuits 19 and 24, the modification of the encoder number by the selected number from the error program might be either an addition or a subtraction, depending upon whether the mean error for that particular increment of the slide travel is a slide lead or a slide lag error. This would require the add/subtract circuit to have provision for determining whether the operation should be addition or subtraction.

From the foregoing description it will be evident that the illustrated system involves only the modification of one digital number by another digital number, which can be carried out accurately by relatively simple circuitry. Any change in the lead screw error in any increment along the length of the lead screw, such as might occur due to wear on the lead screw over a period of use, can be corrected by replacing the error program card for that increment so as to provide the proper error signals for the worn lead screw. Such replacement can be done more readily and much less expensively than the replacement of a cam serving as the error signal source.

While a presently-preferred embodiment of this invention has been described in detail and illustrated schematically in the accompanying drawing, it is to be understood that the present system is susceptible of other embodiments differing from the particular arrangement described without departing from the spirit and scope of this invention. For example, the lead screw increments into which the error program is divided may be larger or smaller than the one-inch increments described. Also, the drive coupling might be a gear and rack, instead of a lead screw and nut arrangement. Also, the present invention might be embodied in a system in which the nominal position and the error signal are provided by analog signals, with the appropriate error signal being selected in response to the detection of the nominal position of the driven member.

Having described my invention, the following is claimed:

1. An apparatus for determining the position of a movable member along a predetermined path comprising drive means for driving the movable member along the predetermined path, indicating means for rendering signals indicating nominal positions of said movable member as it is moved along the predetermined path by said drive means, said nominal positions indicated by said indicating means differing from actual position of the movable member as it moves along the predetermined path by amounts which vary with movement of the movable member along the predetermined path, correction signal means operating in response to the signals representing nominal positions of said movable member for providing correction signals which vary in magnitude with changes in the nominal position of the movable member as the movable member moves along the predetermined path, said correction signal means being operable to vary the magnitude of said correction signals as a function of variations in the difference between the actual positions to which said movable member is driven by said drive means and the nominal positions of said movable member represented by the signals rendered by said indicating means as said movable member moves along said predetermined path, and means for combining said correction signals and said signals rendered by said indicating means to produce third electrical signals which are more accurately indicative of the positions of said movable member as said movable member moves along the predetermined path than are said electrical signals rendered by said indicating means.

2. Apparatus as set forth in claim 1 further including means for providing visual display of a decimal number corresponding to said third electrical signals.

3. Apparatus as set forth in claim 2 wherein said decimal number designates the position of said movable member from an offset zero position.

4. An apparatus as set forth in claim 1 wherein said drive means is operable to move said movable member sequentially through a plurality of contiguous zones located along said predetermined path, and said correction signal means includes a plurality of information storage means each of which is associated with one of said zones and has stored information which corresponds to the difference between the nominal position indicated by said indicating means and the actual position of the movable member when the movable member is located in the zone associated with said information storage means.

5. An apparatus as set forth in claim 4 wherein the stored information in each of said information storage means corresponds to the mean deviation of the difference between the nominal positions and actual positions of said movable member as it moves through an associated one of said zones.

6. An apparatus as set forth in claim 5 wherein said drive means includes a lead screw.

7. An apparatus for determining the position of a movable member along a predetermined path comprising indicating means for rendering an indication of the position of said movable member, said indicating means including positionable means having positions which correspond to positions of the movable member, drive means for driving the movable member and said positionable means, said positionable means being driven by said drive means to positions which differ from the positions corresponding to the positions of the movable member along the predetermined path, reader means cooperating with said positionable means to sense the positions thereof and to render first electrical signals indicative of the positions of said movable member as represented by the positions of said positionable means, correction signal means operating in dependency on the position of said positionable means for providing second electrical signals which vary in magnitude as a function of variations in the difference between the positions to which said positionable means is driven by said drive means and the positions of said positionable means which correspond to the positions of said movable member as said movable member is moved along said predetermined path, and means for combining said first and second electrical signals to produce third electrical signals indicative of the positions of said movable member and which are more accurate than said first electrical signals.

8. An apparatus as defined in claim 7 wherein said drive means comprises a lead screw which rotates to impart movement to said movable member.

9. An apparatus as defined in claim 7 wherein said movable member is sequentially movable through a plurality of contiguous zones located on said predetermined path, and said correction signal means for producing a plurality of second signals includes a plurality of information storage means each of which is associated with one of said zones and has stored information which corresponds to an error associated with said first electrical signal produced when said movable member is located in the zone associated with said information carrying means.

10. An apparatus as defined in claim 9 wherein said positionable means comprises an encoding means which is driven in synchronism with said movable member and said first electrical signal is derived from position codes therein.

11. An apparatus as defined in claim 9 wherein the information stored by each one of said information storage means corresponds to the mean of the difference between the positions to which said positionable means is driven by said drive means and the positions of said positionable means which correspond to the positions of said movable member as the movable member moves through the zone which is associated with said one of said information storage means.

12. An apparatus as defined in claim 11 wherein said drive means comprises a lead screw which rotates to impart movement to the movable member.

13. A method of determining the position of a movable member which moves along a path, said method including the steps of measuring actual positions of the movable member as the member moves along the path, rendering a plurality of indications corresponding to the measured positions of the movable member as the member moves along the path, comparing the indicated positions of the movable member with the corresponding measured positions of the movable member to derive a plurality of error factors having magnitudes which vary as a function of variations in the differences between the measured positions of the movable member and the positions represented by the corresponding indications, storing the error factors in an error factor storage means, moving said movable member along the path, rendering indications corresponding to the position of the movable member, activating the error factor storage means to provide error signals which vary in magnitude in accordance with variations in the position of the movable member and the associated error factors as the member moves along the path, and combining the error signals and the indications of the positions of the movable member to derive position signals indicative of the positions of the movable member and which are more accurate than the indications as the member moves along the path.

14. A method of determining the position of a movable member as is define in claim 13 wherein the step of comparing the indicated positions of the movable member with the corresponding measured position of the movable member includes the step of determining the mean deviation of the error associated with the indications when the member is in each of a plurality of zones along the predetermined path and wherein said step of activating the error factor storage means comprises the step of initiating an error signal which is associated with the zone in which the member is located and which is equal to the mean deviation of the error for the indications of that particular zone.

* * * * *